Feb. 27, 1962   A. A. EMMERLING ETAL   3,023,262
BATTERY ELECTRODE
Filed Aug. 13, 1952

INVENTORS
ANSON A. EMMERLING
HAROLD B. KAUFMAN, JR.
WILLIAM J. OSBORNE
RICHARD A. STEENROD, Jr.

BY
ATTORNEYS

3,023,262
BATTERY ELECTRODE

Anson A. Emmerling, Albany, and Harold B. Kaufman, Jr., New York, N.Y., William J. Osborne, Newton, Pa., and Richard A. Steenrod, Jr., Troy, N.Y., assignors, by direct and mesne assignments, to the United States of America as represented by the Secretary of the Navy
Filed Aug. 13, 1952, Ser. No. 304,188
5 Claims. (Cl. 136—120)

The present invention relates generally to battery electrodes, and more particularly to compositions of salt type electrodes and structures therefor particularly adapting them for use in pile type batteries.

In the manufacture of pile type batteries, in order to conserve space and simplify construction, it is desirable that intercell connections be had directly within the battery per se, as by direct electrical contact between the anodes and cathodes of adjacent cells. Additionally, it is desired that the interelectrode space in each cell be held to a minimum and that the means for holding the electrodes in a desired space relationship also enhance the structural rigidity of the battery. Also, in the instance of employing a salt type electrode, since salts in general provide a relatively high resistance to electron and electrochemical current flow, it is further desirable that means be provided in the electrode structure for readily accumulating electrons as freed by electrochemical battery action and that a low resistance path therefor be afforded, thus maintaining the internal cell resistance at a minimum. The present invention is directed toward a salt electrode structure for enabling the foregoing characteristics, and is further directed toward a salt electrode composition amenable to the desired structure.

It is therefore one object of the present invention to provide a salt type electrode which is structurally sound and provides good electrical conduction properties.

Another object of the present invention is to provide a salt type electrode which affords good electrical series connection with an electrode of an adjacent cell.

Another object of the present invention is to provide a salt type electrode which may be readily beaded, thereby facilitating the use of glass beads or the like as interelectrode spacers.

Another object of the present invention is to provide salt compositions suitable for use as battery or cell electrodes.

Another object of the present invention is to provide salt-binder compositions suitable for use as battery or cell electrodes.

Another object of the present invention is to provide electrode compositions employing soluble salts as the electrochemically active ingredient.

Another object of the present invention is to provide electrode compositions employing copper chloride, in either the cuprous or cupric form, as the electrochemically active ingredient.

Other objects and many of the attendant advantages of this invention will be readily appreciated as the same becomes better understood by reference to the following detailed description when considered in connection with the accompanying drawings wherein.

Figure 4:
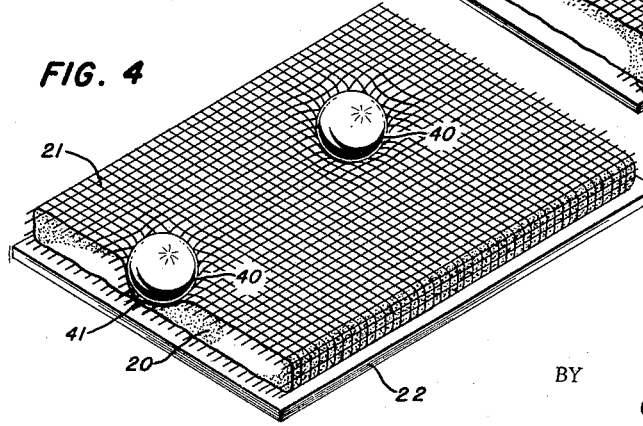
FIG. 4 shows the embodiment of FIG. 2 after being beaded.

In the manufacture of batteries it is necessary to space the anode and cathode of a cell from one another. In accordance with the teachings of the present invention it is found desirable and efficient in the manufacture of pile type batteries to utilize beads of electrically non-conducting materials such as glass or the like as the interelectrode spacers. In so doing it is preferred to partially embed the beads in one electrode, as illustrated in FIG. 4 whereupon the other electrode may be placed up against the protruding beads. The space thus provided is filled with a suitable electrolyte to complete the cell.

In providing a cell employing a magnesium anode and a cuprous chloride cathode, it was found that although cuprous chloride salt can be fused and formed into a sheet, such an electrode is too brittle to be beaded. It has been found, however, that suitable electrochemical properties may be obtained from a cuprous chloride electrode formed from a composition of the cuprous chloride and a wax in which the salt is miscible as a binder therefor. By choosing a wax of appropriate moldable or deformable properties, the electrode thus formed may be readily beaded for the purposes and in the manner above indicated. Further, as is apparent, if a wax is chosen which is too hard and brittle to be beaded at ordinary temperatures, it may be heated as necessary to sufficient softness to permit its being beaded. The choice of a particular wax for a particular cell application must, of course, be had in light of the contemplated temperatures to be encountered in the application of the cell, so that the electrode will retain its body and shape.

As specific embodiments of the electrochemical electrode composition, it has been found that waxes such as paraffin or Carbowax–4000 are suitable binders for cuprous chloride. However, it is understood that any wax which will serve the purpose of a binder under the expected conditions of use can be employed; and generally any material that is miscible with the electrode salt and is plastic or solid with good salt binding properties at the contemplated temperature of application can be used in practicing the teachings of the present invention. As to the relative proportions of binder and salt, since the binder is electrochemically inert in the cell, the criteria of relative proportions is principally determined by the particular binder's binding properties considered together with the desire to maintain the electrochemically active ingredient, the salt, proportion at a sufficiently high level to provide the electrical properties required of the cell or battery. Thus, the proportions actually to be employed in any particular cell or application will depend upon the particular binder employed, the salt used, and the electrical characteristics desired.

Figure 1:
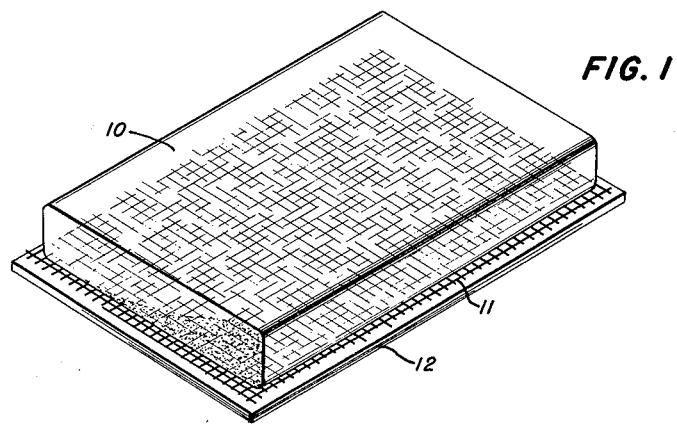
FIG. 1 is an isometric view of one electrode embodiment embraced by the present invention.
Figure 2:
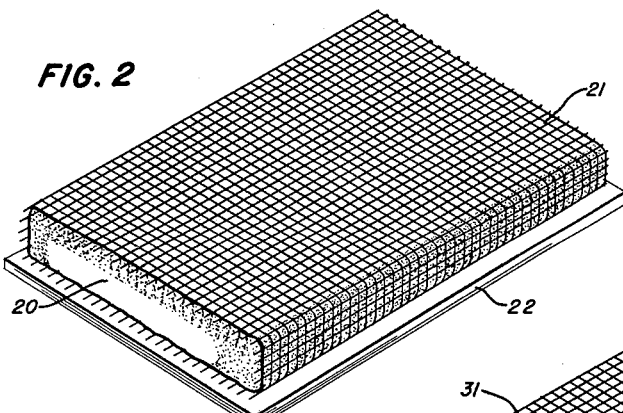
FIG. 2 is a similar view of a second embodiment of electrode structure; embraced by the present invention.
Figure 3:
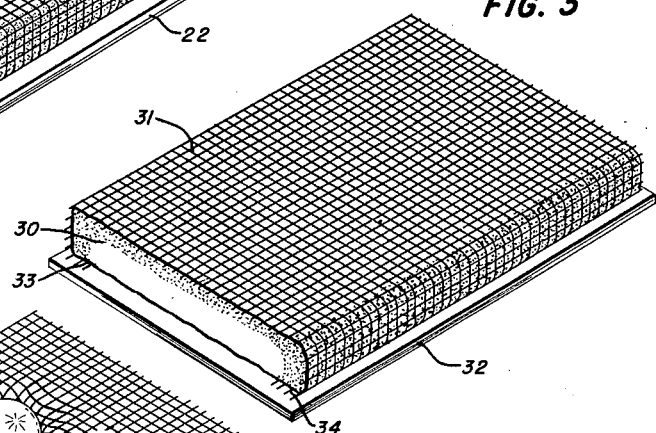
FIG. 3 is a similar view of a third embodiment of electrode structure.

In addition to the binder-salt compositions, it is desirable to provide in the electrode structure means for imparting rigidity and body to the compositions, means for aiding in collecting the current developed by cell action, means for isolating the several cells, and means for conducting the current developed from the cathode of one cell to the anode of the next. In furtherance of these ends several electrode structures are illustrated in the drawings. In the embodiment of FIG. 1, a binder-salt cake 10, such as paraffin-cuprous chloride, is backed by a sheet of copper mesh 11, which is in turn affixed to a sheet of copper foil 12. In the embodiment of FIG. 2, the binder-salt cake 20 is substantially enclosed on four sides by the copper mesh or grid 21, the latter being affixed to the copper foil sheet 22. The embodiment of FIG. 3 is similar to that of FIG. 2 except the copper mesh 31 encloses the binder-salt cake 30 on only three sides, the copper foil sheet 32 covering the fourth side of said cake. Here, the copper mesh 31 is brought into contact with the foil 32 only at 33 and 34 and there affixed to the foil. In FIG. 4, the electrode of FIG. 2, as exemplary of the other embodiments, is shown beaded with the glass beads 40 partially embedded therein, it being understood that each of the other electrode embodiments may be similarly beaded. As here shown, and for reasons to be subsequently explained, it is desirable in this embodiment and when beading that of FIG. 3 for the beads 40 to be sufficiently impressed into the electrode as to push the upper grid or mesh surface into electrical contact with the lower grid surface and/or with the foil 22, as at 41.

In each of the above embodiments the binder-salt cake provides the electrochemical electrode, and the copper mesh or grid functions principally as a low resistance current collector for the electrode, incidentally lending structural support to the electrode and facilitating the fabrication of the cell by acting as a backing or enclosure for the binder-salt cake. The copper foil plate which is attached to the grid or mesh also lends structural support to the electrode and facilitates the fabrication of the cell, but more important, it provides a backing upon which or adjacent to which the anode of the next cell may be mounted, thus being provided for the primary purposes of electrochemically segregating and electrically interconnecting the several cells of a battery. Since the cake encompassing mesh and sheet of foil function together as the means of conducting electrical current developed in the battery between cells, the above-mentioned desirability of impressing the beads so as to bring the outer surface of the mesh into electrical contact with the foil becomes apparent. By the instant expedient the shortest electrical paths available to the electrode outer surface in contact with the electrolyte are provided, thus measurably improving the battery internal resistance characteristics by substantially eliminating or reducing the necessity of conversion of developed electrons to ions with the attendant loss of voltage due to the high electrochemical resistance paths through the binder-salt cake.

As a further aspect or modification of the present invention, it has been found that by employing the above teachings one may fabricate a cell employing a salt type electrode in which the salt employed is very or appreciably soluble in the electrolyte, as for example a cupric chloride electrode to be used as the cathode in conjunction with a magnesium anode in a water solution of sodium chloride as the electrolyte. This can be done by compounding a wax-cupric chloride (or other soluble salt) composition and forming therewith an electrode structure of the types above described. For the proper operation of a salt type cell of the type here concerned, it is necessary for some of the salt to enter the electrolyte solution, yet the rate at which the salt enters the solution should not be so great that the life of the battery be limited by the complete dissolving of the salt electrode. In the case of a salt having only a slight degree of solubility in the electrolyte, as cuprous chloride, this problem does not enter, for after the initial saturation of the electrolyte solution the electrode loses its salt molecules only as necessitated by the generation of electric current. But the situation is otherwise in the case of a salt having a high degree of solubility in the electrolyte solution, as cupric chloride, and some provision must be made to inhibit the rate of solution of the electrode salt.

By using a wax binder comprising in part a water soluble wax, such as Carbowax-4000, Carbowax-6000, or Carbowax-10000, and in part a water insoluble wax, such as Albacer, Aerawax, beeswax, Rezo Wax B, or Parawax, and incorporating therein the soluble electrode salt, such as cupric chloride, the rate of solution of the salt is controlled or inhibited by the relative proportions of insoluble to soluble wax. With the proportions of the two waxes properly chosen for a particular application of the salt type cell, the rate of solution of the salt may be made to approximate that needed to supply the particular current requirements.

In this latter embodiment, the proportions of binder to salt and the choice of the binder to be employed are controlled by the same criteria as indicated above in describing the slightly soluble salt or cuprous chloride electrode. It was found that 70 to 80% cupric chloride with 30 to 20% wax binder gave adequate electrical capacity and physical strength to the electrode for most applications, while 70% cupric chloride with 30% wax binder proved the most practical proportion.

Although in the foregoing description of the electrode compositions emphasis is placed upon the use of wax and compositions of waxes as binders for soluble and slightly soluble electrode salts, the present invention is not limited to wax binders, for any material miscible with the salt, which exhibits suitable binder properties for the particular salt employed, and which affords to the electrode the desired plasticity or body is within the contemplation of the present teachings. For example, a soluble plastic such as one consisting of 50% Elvanol 51–05 and 50% triethylene glycol as plasticizer may be employed as the binder for a soluble salt. It was found that optimum results are obtained in the case of this latter binder with cupric chloride by employing 80% cupric chloride to 20% binder.

It can thus be seen that the present invention embraces novel salt type electrode structures particularly adapted for use in pile type batteries, and in addition embraces compositions of relatively soluble and insoluble salts with appropriate binders therefor, providing the electrochemically active ingredient of the electrode in a form having appropriate physical characteristics for use in the novel electrode structures.

Obviously many modifications and variations of the present invention are possible in the light of the above teachings. It is therefore to be understood that within the scope of the appended claims the invention may be practiced otherwise than as specifically described.

What is claimed is:

1. A composition for salt type electrodes for electrochemical battery cells comprising an electrochemically reactive salt soluble in the electrolyte and an electrochemically inert binder therefor comprising in part a water soluble wax and in part a water insoluble wax both miscible with said salt to control the rate of solution of said reactive salt.

2. A composition for salt type electrodes for electrochemical battery cells comprising cupric chloride salt as the electrochemical active ingredient thereof and an electrochemically inert binder therefor comprising in part a wax soluble in the electrolyte and in part a wax insoluble in the electrolyte both miscible with said salt to control the rate of solution of said salt.

3. A composition for salt type electrodes for electrochemical battery cells comprising an electrochemically reactive salt only slightly soluble in water and an electrochemically inert binder therefor of a plastic material being slightly soluble in water and being miscible with said salt.

4. A salt type electrode structure for battery cells comprising a cake formed from an electrochemical reactive salt, a water soluble binder miscible with said reactive salt, a mesh of electrically conducting material substantially surrounding in continuous contact and affixed to said reactive salt cake on four sides thereof, a sheet of electrically conducting and electrochemically non-conductive material affixed to and backing said mesh and cake, and electrically nonconducting beads partially imbedded in the assembly thus formed to provide inter-electrode spacers whereby said salt cake electrode is a structurally stable compact electrode providing good electrical series connection with an electrode of an adjacent cell.

5. In combination, a salt-binder cathode for electrochemical battery cells, a mesh of electrically conducting material substantially surrounding and in continuous contact with said cathode on four sides thereof for collecting current, a sheet of electrically conducting material affixed to said mesh as an inter cell electrical connector and electrochemical insulator, and electrically non-conducting beads imbedded in said electrode as an electrode spacer whereby said salt-binder cathode is a structurally stable compact cathode providing good electrical series connection with an electrode of an adjacent cell.

References Cited in the file of this patent

UNITED STATES PATENTS

| | | |
|---|---|---|
| 290,941 | Starr | Dec. 25, 1883 |
| 623,195 | Werner | Apr. 18, 1899 |
| 2,639,306 | Fishback | May 19, 1953 |
| 2,684,395 | Chubb | July 20, 1954 |
| 2,988,587 | Haring | June 13, 1961 |